United States Patent [19]
Kuchta

[11] Patent Number: 5,438,226
[45] Date of Patent: Aug. 1, 1995

[54] APPARATUS FOR REDUNDANT COOLING OF ELECTRONIC DEVICES

[75] Inventor: Douglas A. Kuchta, Rochester, Minn.

[73] Assignee: International Business Machines Corporation, Armonk, N.Y.

[21] Appl. No.: 945,549

[22] Filed: Sep. 16, 1992

[51] Int. Cl.⁶ .............................................. H05K 7/20
[52] U.S. Cl. .................................... 307/125; 361/687; 361/695
[58] Field of Search ............... 307/112, 116, 117, 125, 307/139; 318/471; 388/939; 361/687, 695

[56] References Cited

U.S. PATENT DOCUMENTS

| | | | |
|---|---|---|---|
| 3,903,404 | 9/1975 | Beall et al. | 361/687 |
| 4,502,100 | 2/1985 | Greenspan et al. | 361/384 |
| 4,514,746 | 4/1985 | Lundqvist | 361/385 |
| 4,758,925 | 7/1988 | Obata et al. | 361/695 |
| 5,065,585 | 11/1991 | Wylie et al. | 62/89 |
| 5,117,430 | 5/1992 | Berglund | 370/85.1 |
| 5,121,291 | 6/1992 | Cope et al. | 361/687 |

FOREIGN PATENT DOCUMENTS

| | | | |
|---|---|---|---|
| 356054531A | 5/1981 | Japan | 361/687 |
| 62-48290 | 3/1987 | Japan . | |
| 1-72596 | 3/1989 | Japan . | |
| 63145859 | 5/1990 | Japan . | |
| 3-97187 | 4/1991 | Japan . | |
| 403155321A | 7/1991 | Japan | 361/687 |

*Primary Examiner*—Jeffrey A. Gaffin
*Attorney, Agent, or Firm*—Roy W. Truelson

[57] ABSTRACT

An enclosure for heat generating electronic components establishes an airflow path for cooling air. Air is forced through the enclosure by powered air movers, one of which is mounted at the air inlet to the enclosure, and the other of which is mounted at the outlet. Preferably only one air mover is used at a time. In the event of failure of the air mover being used, the remaining air mover begins operation. The total cooling airflow passes through both air movers, and thus the air movers may thus be said to be arranged in series with respect to the airflow. Because the air movers are mounted in series with respect to the airflow, the airflow pattern is substantially the same regardless of which air mover is currently operating. Thus, hot spots which may result when one fan in a fan bank fails are avoided. In the preferred embodiment, the enclosure houses a redundant array of independent disks (RAID) of a computer system. In an alternative embodiment, air movers arranged serially with the airflow can be used to provide additional cooling for severe operating conditions.

16 Claims, 3 Drawing Sheets

APPARATUS FOR REDUNDANT COOLING OF ELECTRONIC DEVICES

FIELD OF THE INVENTION

The present invention relates to redundant operation of electronic devices, and in particular to redundant design of cooling apparatus for electronic devices.

BACKGROUND OF THE INVENTION

The spectacular proliferation of electronic devices, particularly computers, in modern society, both in numbers and complexity, demands that such devices satisfy ever increasing standards of reliability to avoid degeneration into chaos. In the early days of the computer industry, the relatively high failure rates associated with certain components diverted attention from occasional failures of other, more reliable, components. As failure rates of various electronic components have been drastically reduced, designers seeking to improve the overall reliability of a complex electronic device are forced to focus on all potential sources of failure.

One potential source of failure for an electronic device such as a computer is its cooling system. Electronic components typically generate considerable heat in a small, enclosed space. It is frequently necessary to provide auxilliary cooling of the components to prevent a rise in temperature to the point where the components are damaged or can not function normally. A common method is to provide a fan to establish an airflow past the heat producing components. If the fan should fail, the temperature of critical components may rise to the point where the component is damaged or the system shuts itself down.

In some systems, multiple fans are mounted in a bank to provide some level of redundancy in the event of failure of any single fan. In such banked designs, each fan moves a portion of the air being used to cool the device, the total cooling capacity of the bank of fans being greater than minimally necessary to cool the device. If a single fan fails, the airflow created by the remaining functioning falls is intended to be sufficient to cool the system.

In the fan bank approach, however, the loss of a single fan changes the airflow pattern. Air will continue to move past the heat generating components near the fans still operating, but airflow past those components closest to the failing fan may be considerably reduced, creating hot spots. Thus, care must be taken in fan bank designs so that any hot spots created by loss of a single fan will not exceed permissible operating temperature parameters. In addition, unless louvers are added to the fan assembly, air may go through the opening for the failing fan backwards, creating a short circuit in the airflow path which accomplishes little cooling. The design must also account for this potential backward airflow.

The existing art does not teach a simple and inexpensive redundant cooling system which maintains its cooling characteristics in the event of failure of one of the air movers.

SUMMARY OF THE INVENTION

It is therefore an object of the present invention to provide an enhanced method and apparatus for cooling electronic components.

Another object of this invention is to increase the reliability of an electronic device.

Another object of this invention is to provide an enhanced method and apparatus for providing redundancy in the cooling system of an electronic device.

Another object of this invention is to increase the effectiveness of a backup cooling system for an electronic device which cools the device in the event of failure of a primary cooling system.

Another object of this invention is to provide enhanced concurrent maintenance of an electronic device.

Another object of this invention is to increase the reliability of a redundant array of storage devices in a computer system.

An electronic device comprises a plurality of heat generating electronic components housed within an enclosure. An airflow path is established in the enclosure for the purpose of providing cooling air to the heat generating components. The airflow path is preferably a substantially straight path, whereby air enters the enclosure through an opening at one end thereof and leaves the enclosure through another opening at the opposite end thereof.

Air is forced through the enclosure by powered air movers, one of which is mounted at the opening through which air enters the enclosure, and another of which is mounted at the opening through which air leaves the enclosure. Preferably, only one of the air movers is operating at any one time. In the event of failure of the air mover being used, the remaining air mover begins operation. Regardless of which air mover is currently in operation, the total cooling airflow passes through both air movers. The air movers may thus be said to be arranged in series with respect to the airflow, as opposed to prior art banked designs which arrange fans in parallel with the airflow. Because the air movers are mounted in series with respect to the airflow, the airflow pattern is substantially the same regardless of which air mover is currently operating. Thus, hot spots which may result when one fan in a fan bank fails are avoided. In addition, there is no tendency for air to flow backward through a failing air mover because the remaining air mover establishes flow in the proper direction.

In the preferred embodiment, the electronic device is a redundant array of independent disks (RAID) of a computer system, in which a plurality of disk drives and controller electronics are housed within an enclosure. The disk drives and controller electronics provide redundant operation in the event of failure of any one of these components. The addition of redundant cooling means as described above increases the overall reliability of the RAID subsystem.

In an alternative embodiment, backup fans arranged serially with the airflow can be used to provide additional cooling for severe operating conditions.

DETAILED DESCRIPTION OF THE PREFERRED EMBODIMENT

Figure 1:
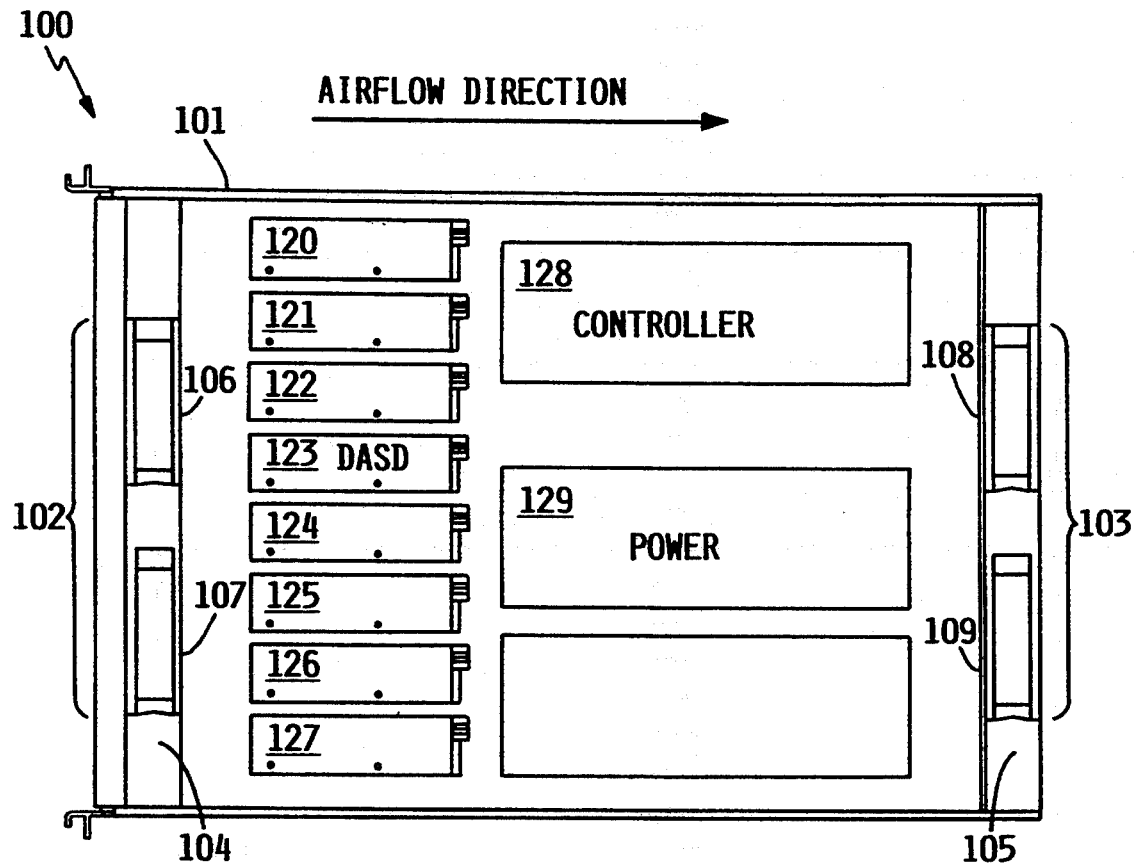
FIG. 1 is a cut-away representation of an electronic device employing a cooling apparatus in accordance with the preferred embodiment of the present invention.

FIG. 1 is a cut-away representation of an electronic device 100 employing the cooling apparatus of the present invention in accordance with the preferred embodiment. In this embodiment, the cooling apparatus is being used to cool a redundant array of independent disks (RAID) subsystem for a computer system. The subsystem 100 comprises an enclosure 101 for the electronic components having an inlet 102 for admitting cooling air at one end and an outlet 103 for exhausting cooling air at the other. In the cut-away view only portions of the enclosure are visible, it being understood that in actual implementation the enclosure substantially surrounds the components. The enclosure, with its inlet and outlet, define a path for an airflow of cooling air. Preferably, this is a relatively straight path as shown. The direction of the airflow is from the inlet to the outlet, i.e., from left to right as indicated in FIG. 1.

A powered air mover 104 is mounted within the enclosure at the inlet, and another powered air mover 105 is mounted at the outlet. Powered air mover 104 comprises two fans 106-107, mounted side-by-side, while powered air mover 105 comprises fans 108-109 mounted side-by-side. Each powered air mover 104,105 is therefore an electro-mechanical assembly, comprising two fan motors and sets of fan blades, with appropriate electrical drive components and couplings, mounted on a suitable mechanical frame. The mechanical frame forms a barrier to air flow except through openings at the location of the fans. While in the embodiment shown in FIG. 1, each powered air mover comprises dual fans, it should be understood that each air mover could be a single fan, or could be a larger number of fans. It should also be understood that the term "powered air mover" is used broadly to encompass any mechanical device for moving air, and includes commonly used centrifugal and screw impeller fans as well as reciprocating blades and other designs. Whatever design implementation is chosen for powered air movers 104 and 105, it is preferred that both powered air movers have identical air motive characteristics.

In the preferred embodiment, the cooling apparatus is being used to cool a redundant array of independent disks (RAID) subsystem for a computer system. The subsystem comprises a plurality of identical, independent, replaceable disk drive units 120-127, a controller unit 128, and a power converter 129. The subsystem may comprise additional units, such as redundant controller units, redundant power converters, backup batteries, etc. A RAID subsystem is designed in such a manner that data on disk drive units 120-127 is redundantly stored, such that should any single disk drive unit 120-127 fail, the data stored on that unit can be reconstructed from data stored on the remaining units. Controller unit 128 contains means for maintaining data redundancy among the disk drive units, typically by maintaining parity records on one or more of the disks which permit data recovery from any single disk failure. Such data redundancy and recovery techniques are known in the art and described in Patterson, et. al., "A Case for Redundant Arrays of Inexpensive Disks (Raid), ACM Sigmod Conference, June, 1988. Preferably, sufficient redundancy and backup capability exists in the RAID subsystem that it can continue to function and provide access to all data stored thereon in the event of failure of a single disk drive. Thus, the reliability of the subsystem is not necessarily limited by the reliability of the individual disk drives, but by its other components as well, including its cooling system.

Figure 2:
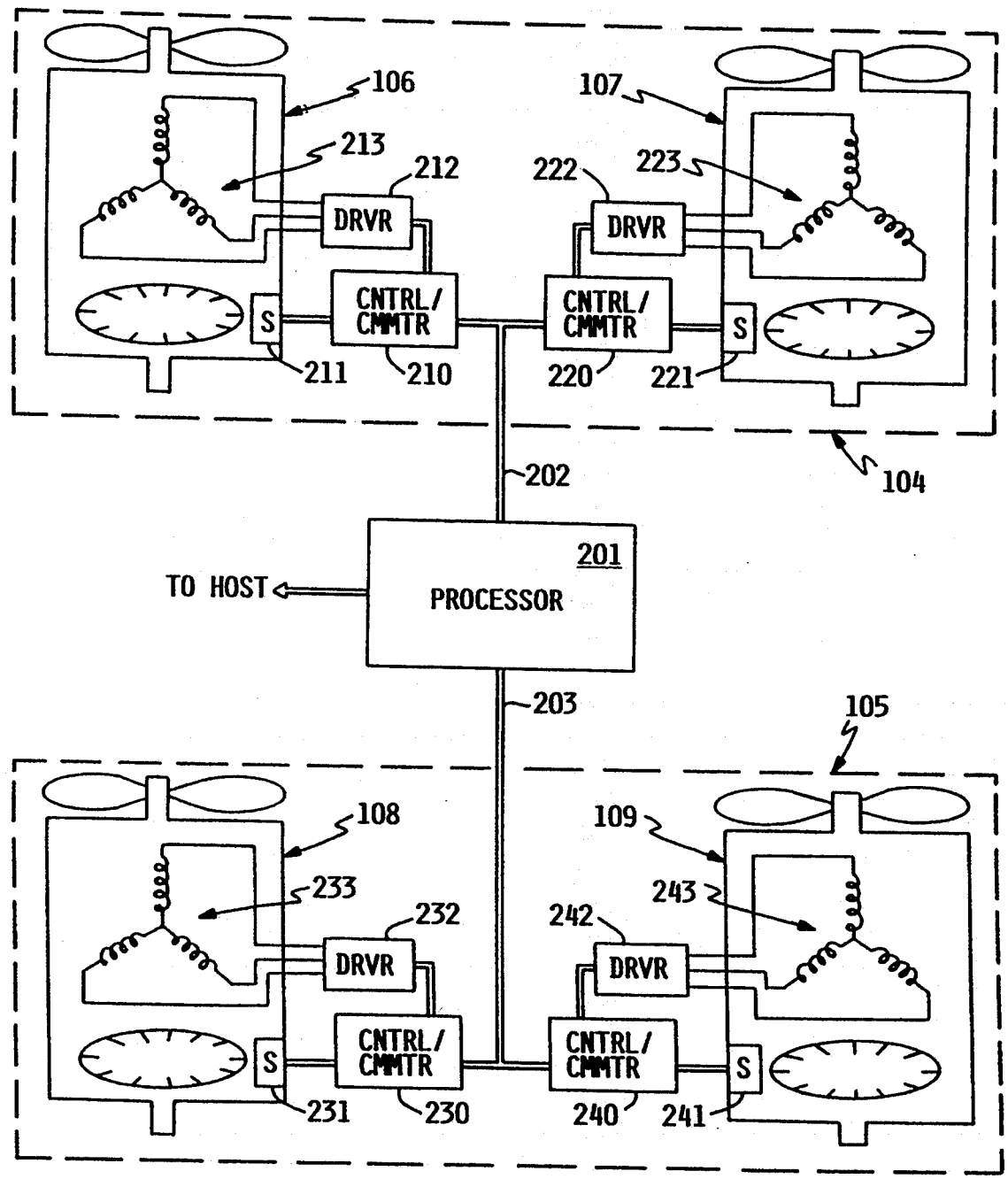
FIG. 2 shows the major electrical components of the cooling apparatus according to the preferred embodiment.

FIG. 2 shows in greater detail the major electrical components of the cooling apparatus according to the preferred embodiment of the present invention. In the preferred embodiment, the cooling system comprises a single monitor processor 201 and two redundant powered air mover assemblies 104,105. Processor 201 is a general-purpose programmable microprocessor which monitors cooling system state and directs the operation of redundant powered air mover assemblies 104,105. Processor 201 may have other functions in addition to monitoring and directing the cooling system, such as monitoring power levels, communicating with a host system, etc. Processor 201 is preferably an Intel 8051 family microprocessor, although other processors could be used. Processor 201 is physically mounted within enclosure 101, but is not mounted within or upon either powered air mover assembly. Mounting processor 201 apart from the air mover assemblies permits replacement of the assemblies without disturbing the operation of processor 201. Processor 201 communicates with controller/commutators 210,220,230,240 located in powered air mover assemblies 104 and 105 over serial communication links 202 and 203 as shown in FIG. 2. Controller/commutators 210,220,230,240 are special-purpose logic circuits which drive fan motors 106-109, respectively. The controller/commutators could alternatively be suitably programmed general-purpose microprocessors.

In the preferred embodiment, fan motors 106-109 are identical 3-phase brushless D.C. motors as are known in the art. Such motors typically comprise a permanent magnet rotor, and a 3-phase stator. A commutation sensor 211,221,231,241 located within each motor is connected to a respective controller/commutator 210,220,230,240. Appropriate logic exists within controller/commutator to determine the current angular position of the rotor from electrical signals received from the commutation sensor. The commutation sensor and associated commutator logic in the controller/commutator may employ any of various techniques known in the art for determining angular position, such as optical encoding, magnetic encoding, etc. Each controller/commutator 210,220,230,240 controls the operation of a respective current driver 212,222,232,242. The controller determines which stator windings to energize based on the current angular position of the rotor and other factors, such as desired speed of operation. The current driver energizes the appropriate phases of the respective stator windings 213,223,233,243 in response to signals received from the controller/commutator.

In normal system operation, only one powered air mover 104 is operating and forcing air movement through the enclosure 101. This "normally on" powered air mover is designated the primary powered air mover. Powered air mover 105 is a redundant or backup unit which is not normally used. However, powered air mover 105 may be briefly operated at intervals to verify its readiness, and to cycle lubricants or clear away dust. Air being forced through the enclosure by powered air mover 104 passes through the fan openings and spaces between fan blades of powered air mover 105. While forcing the cooling air through these openings in powered air mover 105 adds some resistance to the flow of air, this resistance is typically small or negligible in comparison to the total resistance presented by the enclosure 101 and electronic components housed therein.

During operation, controller/commutators 210, 220 are constantly sensing a rotation of the respective rotors by changes at sensors 221,221, and switching current drivers 212,222 in response thereto. If either fan motor 106,107 should stop rotating for any reason, the respective sensor will stop detecting changes of angular position. The controller/commutator will detect this occurrence as part of its normal operation.

Figure 3:
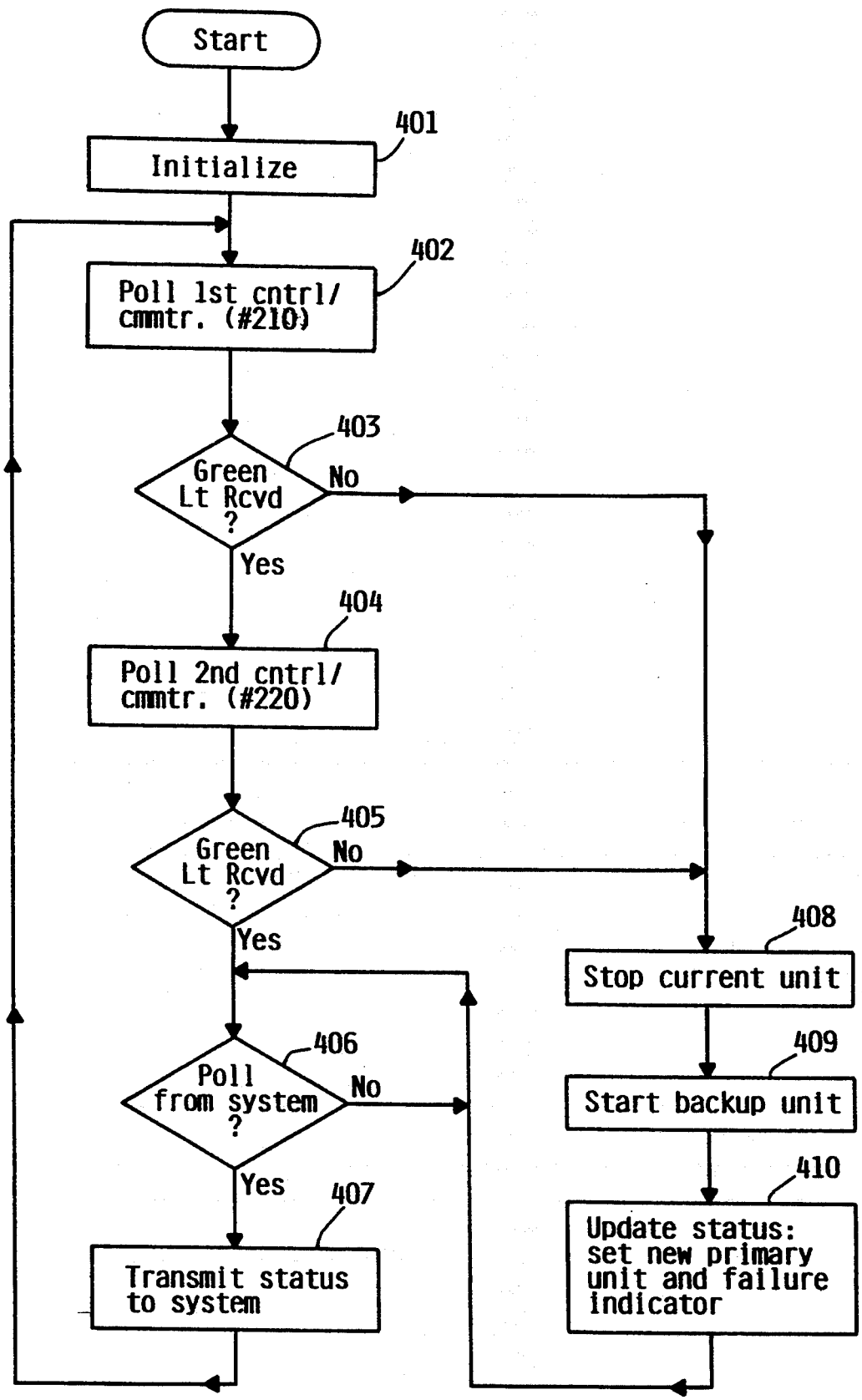
FIG. 3 shows the steps taken by the control processor to control the operation of the cooling apparatus according to the preferred embodiment.

FIG. 3 shows the steps taken by a control program executing in processor 201 to control the operation of the redundant cooling device in accordance with the preferred embodiment. The control task is initialized at step 401, and then periodically polls each controller/commutator to verify that the respective motor is rotating normally. At step 402, processor 201 issues a poll to first controller/commutator 210 to determine its status. If fan motor 106 is rotating normally, controller/commutator 210 responds to the poll with an appropriate "green light" message indicating that its motor is functioning as it should. If processor 201 receives the "green light" message (step 403), it continues by polling second controller commutator 220 at step 404, and again checking for the appropriate "green light" message indicating that motor 107 is operating at step 405. If processor 201 again receives the "green light" message, it continues to step 406, where it waits in an idle loop until a status poll is received from the host system. When the status poll is received, processor 201 responds by transmitting status to the host system at step 407, and returning to step 402 to repeat the process.

If processor 201 fails to receive the "green light" message at steps 403 or 405 (i.e., it either receives a message indicating that a motor has stopped, or it receives no message at all within a predetermined timeout period), the processor concludes that powered air mover 104 has failed, and takes appropriate action starting at step 408. Processor 201 will first issue a command to controller/commutators 210,220 to cease operations at step 408. At approximately the same time, processor 201 will issue a command to the other controller/commutators 230,240 (i.e., powered air mover 105) to begin operation at step 409. Upon receipt of this command, controller/commutators 230,240 begin operation by switching respective current driver 232,242 to energize the appropriate phases of stator windings 233,243 in response to the angular position of the respective rotors. Processor 201 will then make appropriate changes to its internal status records at step 410. In particular, it will set appropriate records to indicate that powered air mover 105 is now the unit providing cooling to the enclosure, so that subsequent polls are directed to unit 105 (i.e., controller/commutators 230,240). The processor will also set an appropriate failure indicator in its status record to indicate that powered air mover 104 has failed; this failure indicator will be transmitted to the host system when status is next transmitted at step 407.

In the preferred embodiment, processor 201 is part of a node in a monitoring network, which also communicates with a system monitor in the host computer system. Such a monitoring network is described in U.S. Pat. No. 5,117,430 to Berglund, herein incorporated by reference. It should be understood that the cooling system control task depicted in FIG. 3 may be one of several tasks executing in processor 201, and that other tasks, such as monitoring the status of power supplies, battery backups, etc., may be concurrently performed by processor 201. Upon detecting a failure of powered air mover 104 as described above, processor 201 also sends a message to the host's system monitor apprising it of the failure. The host's system monitor is capable of taking appropriate action to correct the situation. For example, the system monitor will typically display an alert message to the system operator at the system operator's console, warning of the failure of the powered air mover. The system operator can then replace the failing subassembly when convenient or call for service. In more sophisticated monitoring systems, the system monitor may automatically place a service call. The system monitor may perform other functions, such as logging the failure in a history file.

Powered air movers 104,105 are preferably designed to be easily removed and replaced while the host system is operating. The entire powered air mover, along with its associated controller/commutators and current drivers, is replaced as a unit. Suitable couplings (not shown) exist for hot plugging the new unit into the electronic device. Upon replacement, processor 201 is informed of the presence of the new unit by any of various conventional means. For example, the hot plugging hardware may be designed to trigger a reset line in the processor, causing it to poll the new unit. Alternatively, a command may be entered at the system console and communicated to processor 201 from the host's system monitor. Whatever method is used, processor 201 orders the replacement unit 104 to resume normal operation, and shuts down the backup unit 105.

In the preferred embodiment, a single powered air mover is operating at any one time. Primary powered air mover 104 assumes the entire burden of cooling the system, while powered air mover 105 remains unused and exists only for backup purposes. Powered air mover 105 will become operational only in the event of a failure of air mover 104. In an alternative embodiment, operation between air mover 104 and air mover 105 is cyclically switched in alternating, non-overlapping periods, so that both air movers are used, although not at the same time. In this embodiment, processor 201 is programmed to reset a timer each time operation is switched from one powered air mover to the other. Upon detection of a timeout of the timer, the currently operating powered air mover is switched off, the idle powered air mover is switched on, and the timer is reset. The selection of an appropriate timeout period would depend on various design considerations, but would typically be a relatively long period (e.g. hours) in comparison to other operations taking place in a computer system. By sharing the burden of cooling the enclosure, the effective operational age of the primary air mover is reduced and probability of failure can be reduced accordingly. Preferably, in the event of failure of any one air mover, cyclical operation would cease and the remaining air mover would operate full time until the failing unit is repaired or replaced.

In another alternative embodiment, it would be possible to operate both powered air movers simultaneously, but at a reduced power level. In the event of failure of any one air mover, the remaining air mover would then be switched to full power to assume the full burden of moving cooling air through the enclosure.

In accordance with the present invention, a response is made to a failure of the cooling system by invoking the backup powered air mover. In the preferred embodiment, brushless D.C. motors are used to move the air, and failure of the motors is detected by the motor's built-in rotary encoder. The use of the existing rotary encoder avoids the need for special hardware to detect motor failure. In addition, by employing a polling scheme which requires a positive response on the part of the controller/commutators, a failure of the controller/commutators is detected as well. However, it should be understood that a failure of the cooling system is not necessarily limited to a failure of one of the fan motors or the controller/commutator. Additional and/or alternative methods may be employed for detecting the failure of these and other components. Such alternative methods may be desirable where a different form of air mover is being used, or to broaden the scope of failures that are detected as described below.

In an alternative embodiment of the present invention, at least one of the powered air movers is switched in response to failure to cool the enclosure, even though the other powered air mover may still be functioning. Such a failure could be detected, e.g., by one or more thermal sensors suitably located within the enclosure. In normal operation, a single powered air mover would adequately cool the enclosure. Under severe operating conditions, a rise in temperature detected by thermal sensors would cause processor 201 to switch the backup powered air mover on, so that both units operate simultaneously at full power, providing adequate cooling. In this alternative embodiment, it is not necessary to design individual powered air movers having the capability to cool the enclosure under all possible conditions. Instead, the additional powered air mover may be used for cooling in severe conditions.

In the preferred embodiment, the two powered air movers are located at the air inlet and air outlet to the enclosure. However, it would alternatively be possible to locate both powered air movers at the inlet, or both at the outlet, or at other locations. In particular, where turns must be induced in the airflow path, it may be desirable to locate the powered air mover at one of the turns.

In the preferred embodiment, the cooling system of the present invention is used to cool a RAID storage subsystem of a host computer system. However, it will be understood that the cooling system could be used to cool any enclosed electronic components. It could, for example, be used to cool a complete computer system, or another subset of the computer system such as a housing for processor cards. It could also be used to cool many other types of electronic devices, such as consumer electronics (television receivers, music systems, etc.), telecommunications equipment, etc.

Although a specific embodiment of the invention has been disclosed along with certain alternatives, it will be recognized by those skilled in the art that additional variations in form and detail may be made within the scope of the following claims.

What is claimed is:

1. A forced-air cooling system for an electronic device, comprising:
    an enclosure substantially surrounding one or more heat generating components of said electronic device, said enclosure having an inlet for admitting cooling air into said enclosure and an outlet for exhausting cooling air from said enclosure, said enclosure defining a path for an airflow of said cooling air;
    a first powered air mover mounted in said airflow path for moving said cooling air in the direction of said airflow from said inlet to said outlet, wherein substantially all of said airflow passes through said first powered air mover;
    a second powered air mover mounted in said airflow path for moving said cooling air in the direction of said airflow from said inlet to said outlet, wherein substantially all of said airflow passes through said second powered air mover; and
    switching means for switching at least one of said first and second powered air movers from a non-operating mode to an operating mode to adequately provide cooling for said heat generating components.

2. The forced-air cooling system of claim 1, further comprising failure detection means for detecting a failure to adequately provide cooling for said heat generating components, and wherein said switching means is responsive to said failure detection means.

3. The forced-air cooling system of claim 2, wherein said failure detection means detects a failure of at least one of said first and second powered air movers to operate.

4. The forced-air cooling system of claim 2, wherein said failure detection means detects a rise in temperature within said enclosure.

5. The forced-air cooling system of claim 2, wherein said switching means comprises means for switching both said first and second powered air movers to an operating mode to compensate for said failure to adequately provide cooling for said heat generating components.

6. The forced-air cooling system of claim 5, wherein said failure detector means detects a rise in temperature within said enclosure.

7. The forced-air cooling system of claim 1, wherein only one of said first and second powered air movers operates at any one time.

8. The forced-air cooling system of claim 7, wherein said first and second powered air movers operate during alternating, non-overlapping periods.

9. The forced-air cooling system of claim 1, wherein one of said first and second powered air movers is mounted at said inlet, and the other of said first and second powered air movers is mounted at said outlet.

10. The forced-air cooling system of claim 1, wherein one of said first and second powered air movers can be removed from said device and replaced while the other of said first and second powered air movers is operating.

11. A redundant storage subsystem of a computer system, comprising:
    a plurality of independent disk drive storage devices for storing data;
    controller means for maintaining data redundancy among said plurality of independent disk drives;
    an enclosure substantially surrounding said disk drive devices and said controller means, said enclosure having an inlet for admitting cooling air into said enclosure and an outlet for exhausting cooling air from said enclosure, said enclosure defining a path for an airflow of said cooling air;
    a first powered air mover mounted in said airflow path for moving said cooling air in the direction of said airflow from said inlet to said outlet, wherein substantially all of said airflow passes through said first powered air mover;
    a second powered air mover mounted in said airflow path for moving said cooling air in the direction of said airflow from said inlet to said outlet, wherein substantially all of said airflow passes through said second powered air mover;

failure detection means for detecting a failure to adequately provide cooling for said storage subsystem; and switching means responsive to said failure detection means for switching at least one of said first and second powered air movers from a non-operating mode to an operating mode to compensate for said failure to adequately provide cooling for said storage subsystem.

12. The redundant storage subsystem of claim 11, wherein said failure detection means detects a failure of at least one of said first and second powered air movers to operate.

13. The redundant storage subsystem of claim 11, wherein only one of said first and second powered air movers operates at any one time.

14. The redundant storage subsystem of claim 13, wherein said first and second powered air movers operate during alternating, non-overlapping periods.

15. The redundant storage subsystem of claim 11, further comprising means, responsive to said failure detection means, for notifying said computer system of said failure to adequately provide cooling for said storage subsystem.

16. The redundant storage subsystem of claim 11, wherein one of said first and second powered air movers can be removed from said subsystem and replaced while the other of said first and second powered air movers is operating.

* * * * *